United States Patent [19]

Tomizawa et al.

[11] 4,369,462
[45] Jan. 18, 1983

[54] CODING SYSTEM FOR PAY TELEVISION

[75] Inventors: Akimori Tomizawa; Hiroshi Osaka; Ryokichi Kanai, all of Toda, Japan

[73] Assignee: Clarion Co., Inc., Tokyo, Japan

[21] Appl. No.: 178,614

[22] Filed: Aug. 15, 1980

[30] Foreign Application Priority Data

Aug. 17, 1979 [JP] Japan .............................. 54-104843

[51] Int. Cl.³ .......................... H04N 7/16; H04K 1/02
[52] U.S. Cl. .................................... 358/124; 358/122; 358/123
[58] Field of Search ................................ 358/122-124

[56] References Cited

U.S. PATENT DOCUMENTS

| | | | |
|---|---|---|---|
| 4,022,972 | 5/1977 | Pires | 358/124 |
| 4,068,264 | 1/1978 | Pires | 358/124 |
| 4,257,065 | 3/1981 | Papay | 358/124 |

FOREIGN PATENT DOCUMENTS 841627  7/1960  United Kingdom .

Primary Examiner—S. C. Buczinski

[57] ABSTRACT

A coding system for use in a television system wherein at least a part of a television signal is inverted by an encoder at a broadcasting station, according to a code signal and the coded television signal is decoded by decoders of specific subscribers to be reproduced on TV sets. The coding system is comprised of a clock oscillation means, a mode generating means for generating signals indicating plural inversion modes, a counter for counting clock signals from the clock oscillation means, a setting means for outputting a predetermined signal based on addresses provided corresponding to the respective inversion modes of the mode generating means and determined by an output from the counter, and a means for inserting the code signal during a vertical blanking period of the television signal. When the output signal of the mode generating means and the output signal of the setting means are in a given relation, the count value of the counter is used as the code signal.

5 Claims, 8 Drawing Figures

CODING SYSTEM FOR PAY TELEVISION

BACKGROUND OF THE INVENTION

1. Field of the Invention

This invention relates to a coding system for a video signal processing apparatus, and more particularly to a coding system for a wireless pay-TV system which provides special, original programs only to subscribers who make regular payments for the service. In the pay-TV system, a television signal is transmitted from a broadcasting station in coded form provided by inversion of the video signal by an encoder and the coded television signal is decoded by decoders at receivers so as to reproduce the television signal on the receivers.

2. Description of the Prior Art

A so-called wireless pay-TV system, to which the present invention is applicable, has been developed to eliminate annoying commercial messages indispensable to ordinary commercial broadcasting and possible degradation of program quality due to various restrictions inherent to the commercial broadcasting. This wireless system is expected to be spread wide because expenses and time required for laying cables can be curtailed and there is no limitation in number of subscribers.

In general, in the wireless pay-TV system, a television signal and an aural signal are encoded so that the system may be applied only to the subscribers of the system, excluding non-subscribers. A conventional coding system of a video code processing apparatus for encoding a television signal is disclosed, for example, in Japanese Patent Application Laid-Open Specification No. 11515/1978. Encoding of a video signal is carried out by inverting the polarity of the video signal according to codes determined by outputs from flip-flop circuits connected to an oscillator. Thus, a code generating section per se substantially determines an encoding mode, and an encode control signal, which finally determines whether the polarity of the video signal should be inverted or should not be inverted, is changed randomly. The minimum cycle of change of the encode control signal corresponds to a time (about 16.67 ms) required for one field and the frequency of the change is approximately 30 Hz.

In this connection, it is to be noted that when the video signal transmitted after inversion by an encoder at a broadcasting station is decoded by a subscriber's decoder, there may be produced a lag in intensity levels between the original video signal and the decoded video signal by various causes due to a deficiency of the entire transmission system, a difference in characteristics between the encoder and the decoder, etc. This lag in the intensity levels appears in every field, causing flicker on a picture. When the flicker has a frequency of about 30 Hz, i.e., when the encode control signal at the transmitting side changes at a frequency of about 30 Hz, it cannot be negligible for visual sensation of a human being and becomes undesirable for a viewer. Furthermore, the flicker leads in deterioration in picture.

OBJECT OF THE INVENTION

It is therefore an object of the present invention to provide a coding system which is capable of suppressing deterioration in picture quality and flicker in picture caused by coding according to the conventional system and capable of enhancing secrecy and reliability without change or modification of the conventional decoder at the receiver.

SUMMARY OF THE INVENTION

In accordance with the present invention, there is provided a coding system producing an encode control signal for encoding a television signal by inverting at least a part of the television signal, which comprises:

a first means for generating first random code signals;

a second means for generating second random code signals corresponding to a predetermined value of said encode control signal to suppress flicker in a picture reproduced from said television signal; and a third means for inserting said first and second random code signals during a vertical blanking period of said television signal to produce said encode control signal.

DESCRIPTION OF THE PREFERRED EMBODIMENT

Figure 1:
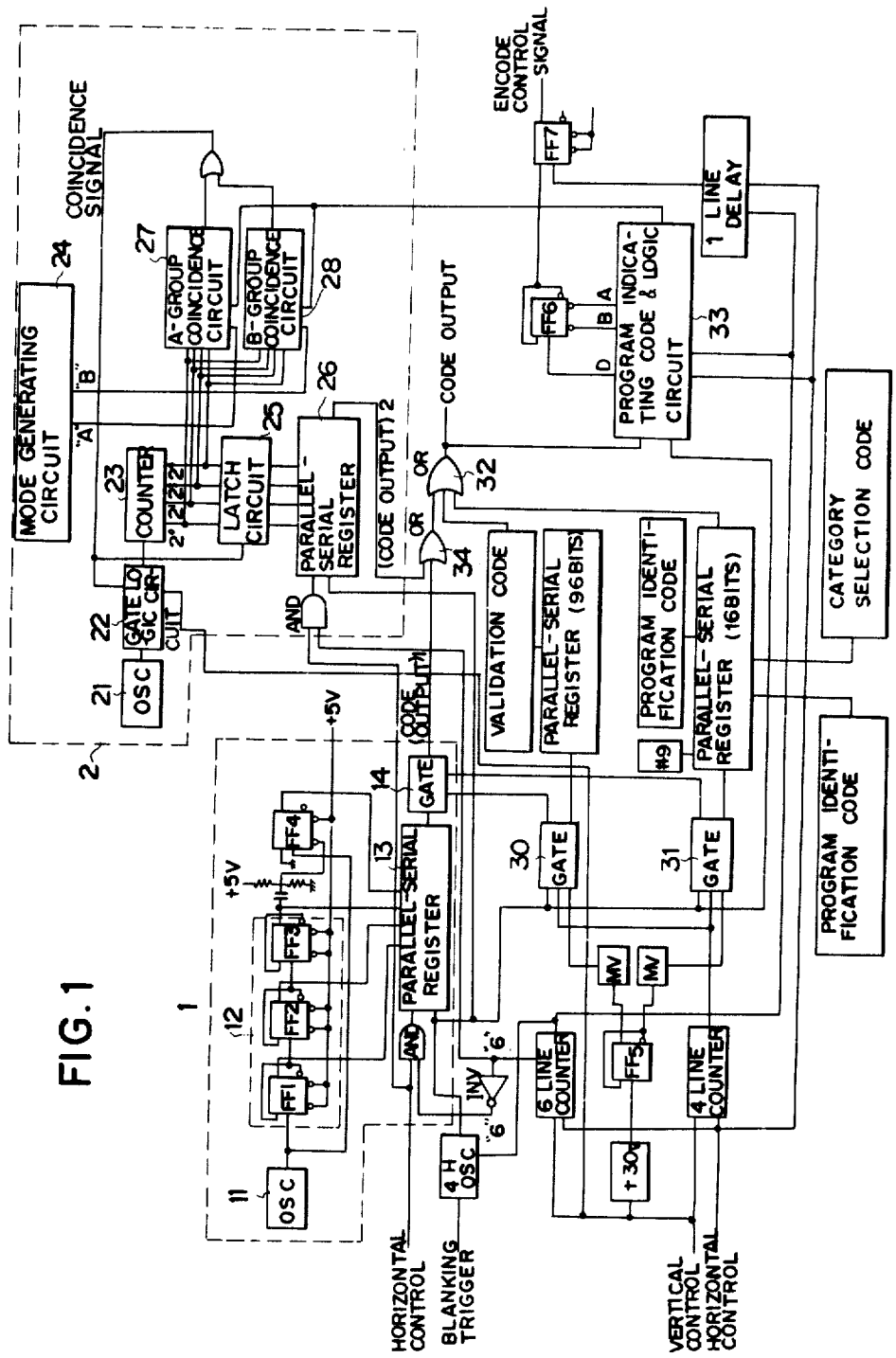
FIG. 1 is a block diagram illustrating a coding system in accordance with the present invention.

FIG. 1 is a block diagram of a coding system in accordance with the present invention. FIG. 1 generally illustrates a circuit for inserting a code number and an identification number (representing charges of a program) into a television signal. Although the most characteristic portion of the present invention is a code generating section 2, the general circuit of FIG. 2 will be referred to for easy understanding of the present invention.

In general, the code number is formed of binary-coded decimal numbers and these numbers are each inserted into one of six lines within a vertical blanking period. Each of the binary-coded decimal numbers requires four bits, and therefore each of horizontal lines into which a binary number is to be inserted is divided into four slots and each slot receives one bit. A random number generator is formed of an oscillator 11 having a frequency higher than a horizontal line frequency and a counter 12. The binary number in the counter 12 is transferred to a parallel-serial output register 13 when a load input of the register 13 receives a horizontal drive pulse through an AND gate. The so inputted code number is read out serially under control of a 4H oscillator. The 4H oscillator has a frequency higher than four multiple of the horizontal line frequency.

The 4H oscillator is driven by an output of a 6-line counter. The 6-line counter produces a signal only during first six lines within the vertical blanking period. As a result, a serial output from the register 13 becomes a random number of from 1 to 8 in each line of the first six lines. In the present invention, however, the output from the 6-line counter is supplied to one input of the AND gate connected to the load input of the register 13 through an inventer so that random numbers are supplied from a code generating section 1 during the first five lines and supplied from the code generating section 2 during the succeeding sixth line. A signal at an output terminal of a gate 14 coincides with an output of a register 13 if an inhibit pulse does not exist. The inhibit pulses are supplied by gates 30 and 31. The inhibit pulse from the gate 30 is supplied when it is required to send a validation code. The validation code is a series of code numbers designed for checking whether the decoder is in a desired mode. The inhibit pulse from the gate 31 is produced when it is required to insert the program identification number into the television signal. Upon driving of the gate 31, contents of a parallel-serial register is read out serially and supplied to a third terminal of an OR gate 32. The OR gate 32 receives, at other inputs, the code number and the validation code as described above.

An output of the OR gate 32 is supplied to a program indicating code and logic circuit 33. Outputs of the circuit 33 are signals A, B and D for determining a mode of a polarity flip-flop circuit of the encoder. The state of the flip-flop circuit determines whether the video signal should be inverted or not and the signals A, B and D put the flip-flop circuit into set, reset and toggle states, respectively.

In the present invention, the code generating section 1 produces a random code, while the code generating section 2 selects and outputs a code corresponding to a given mode. Thus, the possible deterioration of the picture quality perceivable by the viewers is prevented. More specifically, the code, which has been produced randomly in the conventional method, is determined under control and the switching cycle of the encode control signal is elongated so that it becomes difficult to perceive flicker. To this end, the invention employs a system separate from the random code generating section 1, in which a value of the encode control signal is preliminarily determined and a code is selected in accordance with the so determined condition for insertion into the television signal. The code determination is carried out in a reversed sequence as compared with the conventional system. The code to be transmitted is treated by the program indicating code and logic circuit to determine the encode control signal in a manner similar to that in the conventional system. Therefore, the existing decoder is also operative in the present invention and can be used without making any change or modification.

Furthermore, to enhance secrecy of the code, the encode mode is produced randomly and the code for the same mode is varied.

Figure 2:
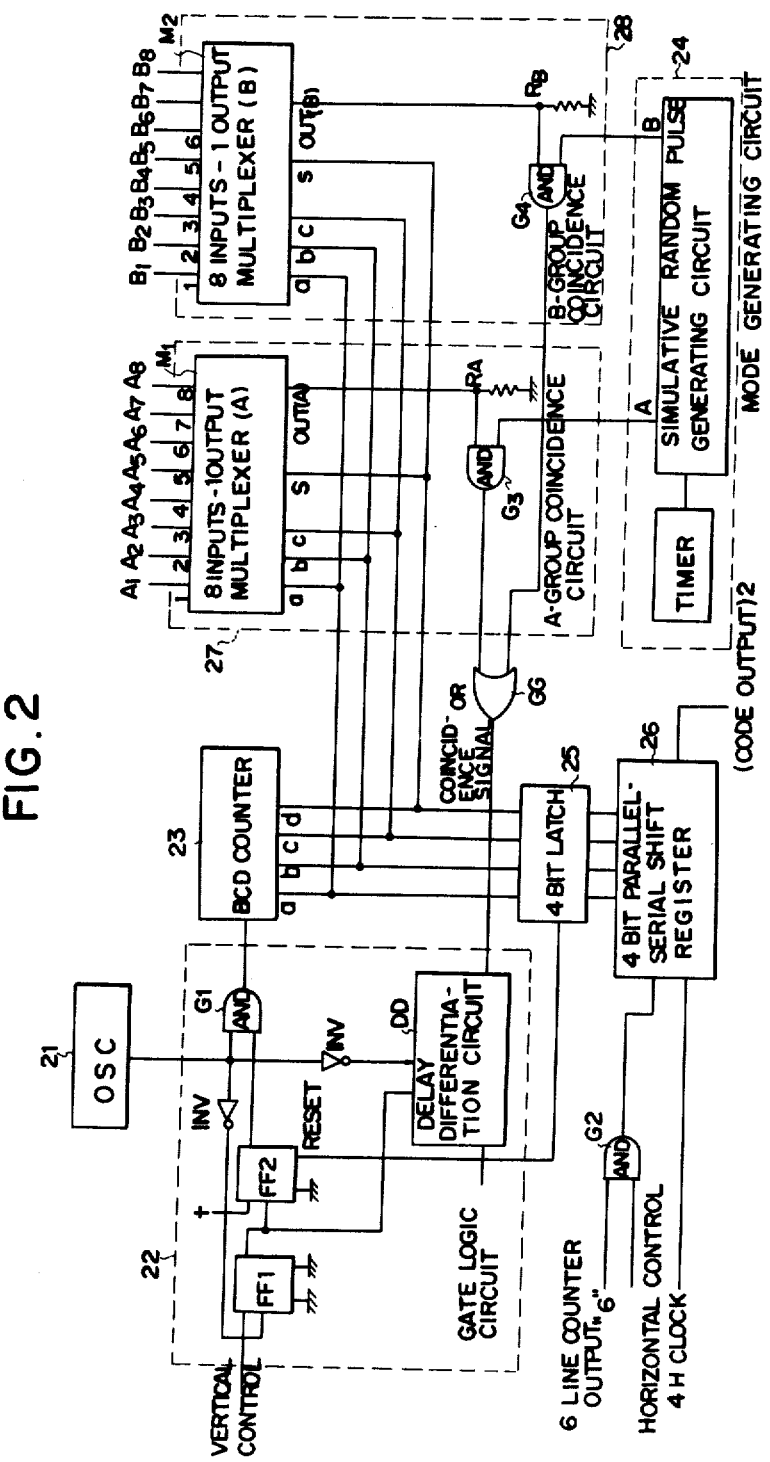
FIG. 2 is a circuit diagram of a code generating section illustrated in FIG. 1.

FIG. 2 is a detailed diagram of the code generating section 2 illustrated in FIG. 1. In FIG. 2, the oscillator 11 of the code generating section 1 may be used for an oscillator 21. A gate logic circuit 22 includes two flip-flop circuits $FF_1$ and $FF_2$, an AND gate $G_1$ and a delay differentiating circuit DD. The circuit 22 supplies an output from the oscillator 21 to a binary coded decimal counter 23 in synchronism with the vertical control signal and supplies a coincidence signal as will be described in detail later to the flip-flop circuits $FF_2$ from an OR gate GG after a delay of a given period (1½ clocks in the embodiment as illustrated) to close the AND gate $G_1$. Thus, clock supply to the binary-coded decimal counter 23 is suspended. At the same time, a timing is determined for making an output of the binary-coded decimal counter 23 latched by a 4-bit latch circuit 25. The binary-coded decimal counter 23 outputs decimal numbers 0 to 9 in a binary form to drive A-group and B-group coincidence circuits 27 and 28 and latch the 4-bit latch circuit 25 in synchronism with outputs of coincidence signals.

Figure 3:
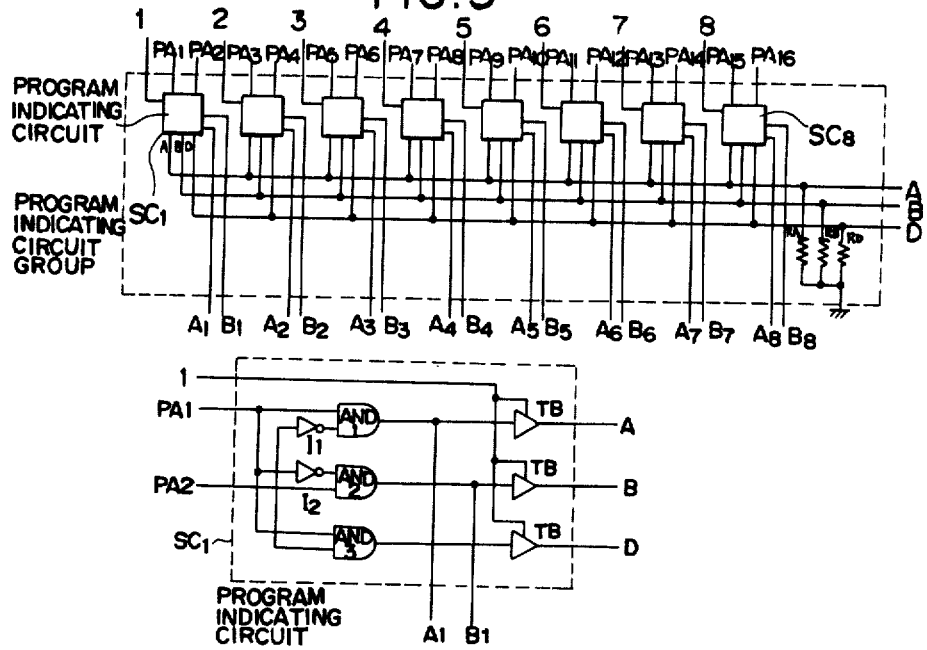
FIG. 3 is a circuit diagram of a group of program indicating circuits.
Figure 4:
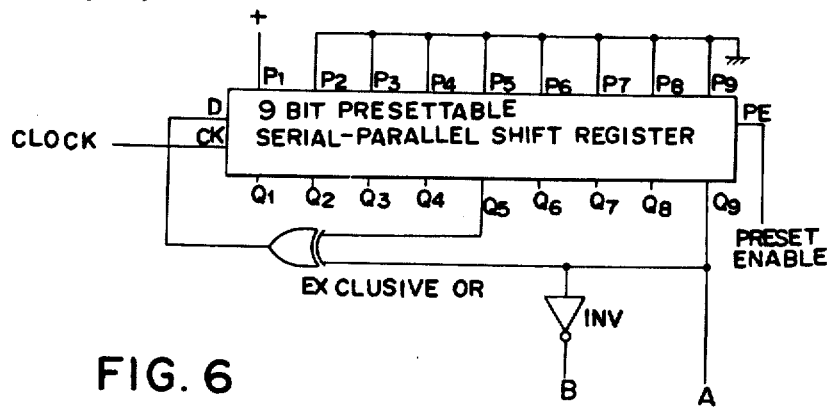
FIG. 4 is a circuit diagram of a simulative random pulse generating circuit illustrated in FIG. 2.

The A-group and B-group coincidence circuits 27 and 28 each include an 8-input and 1-output multiplexer $M_1$, $M_2$ and output the coincidence signal according to the conditions of the output from the binary-coded decimal counter 23, the input from the program indicating code and logic circuit and mode signals A and B from a mode generating circuit 24. In the embodiment as illustrated, each of the multiplexers $M_1$ and $M_2$ is formed of a device of a 3-value signal (logic-1, logic-0 and high impedance) output type. Since the value during the time of high impedance output is made logic-0, the outputs of the multiplexers $M_1$ and $M_2$ are pulled down by resistors $R_A$ and $R_B$. Inputs $[A]_1$ to $[A]_8$ and $[B]_1$ to $[B]_2$ of the multiplexers $M_1$ and $M_2$ are connected as illustrated in FIG. 4. In FIG. 3, inputs ($PA_1$ to $PA_{16}$) of program indicating circuits ($SC_1$ to $SC_8$) are determined by ON/OFF conditions (logic-1 in an ON condition, logic-0 in an OFF condition) of 16 switches $SW_1$ to $SW_{16}$ (not illustrated). Lower three bits (a, b and c) of outputs a, b, c and d from the binary-coded decimal counter 23 are used as an address signal for each of the multiplexers $M_1$ and $M_2$, and the highest bit d is used as a strobe signal S.

The mode generating circuit 24 produces outputs A and B having a time length which is integral multiple of a given unit time length. In this connection, it is to be noted that the outputs A and B have the same meanings as those of the outputs A and B in FIG. 1. In the present embodiment, a timer is employed in combination with a simulative random pulse generating circuit. A 9-stage simulative random pulse generating circuit as illustrated in FIG. 4 is employed as the simulative random pulse generating circuit. The timer supplies a clock to the simulative random pulse generating circuit for determining the unit time length. Therefore, switching cycle of the encode control signal can be controlled by adjusting a unit time of the timer. When the simulative random pulse generating circuit outputs an A-mode (the A-output is logic-1 and the B-output is logic-0), if the output [A] read out from the multiplexer $M_1$ according to the address determined by the output from the binary-coded decimal counter 23 is logic-1, an AND gate $G_3$ supplies, as the coincidence signal, an output of logic-1 to the gate logic circuit 22 through the OR gate GG. A similar operation is effected for the B-mode.

The operation of the present invention will now be described, referring to FIGS. 2 and 5.

For convenience of explanation, it is assumed that the switches $SW_1$ to $SW_{16}$ (not illustrated) provided corresponding to the inputs $PA_1$ to $PA_{16}$ of the program indicating circuits, respectively are set as follows:

| SW     | 1  | 2   | 3   | 4  | 5  | 6   | 7  | 8  | 9  | 10  | 11  | 12 | 13 | 14  | 15  | 16 |
|--------|----|-----|-----|----|----|-----|----|----|----|-----|-----|----|----|-----|-----|----|
| ON/OFF | ON | OFF | OFF | ON | ON | OFF | ON | ON | ON | OFF | OFF | ON | ON | OFF | OFF | ON |

Therefore, the values of the decimal numbers 1 to 8 will be changed by the respective program indicating circuits as follows:

| decimal | 1 | 2 | 3 | 4 | 5 | 6 | 7 | 8 |
|---------|---|---|---|---|---|---|---|---|
|         | A | B | A | D | A | B | A | B |

The values of the inputs $[A]_1$ to $[A]_8$ $[B]_1$ and $[B]_8$ will be as follows:

| $[A]_n$ | $[A]_1$ | $[A]_2$ | $[A]_3$ | $[A]_4$ | $[A]_5$ | $[A]_6$ | $[A]_7$ | $[A]_8$ |
|---------|---------|---------|---------|---------|---------|---------|---------|---------|
| 1/0     | 1       | 0       | 1       | 0       | 1       | 0       | 1       | 0       |
| $[B]_n$ | $[B]_1$ | $[B]_2$ | $[B]_3$ | $[B]_4$ | $[B]_5$ | $[B]_6$ | $[B]_7$ | $[B]_8$ |
| 1/0     | 0       | 1       | 0       | 0       | 0       | 1       | 0       | 1       |

The code number is inserted into the first six lines of the vertical blanking period in such a manner that the code signals for the first five lines are generated by the code generating section 1 and the code signal for the six line is generated by the code generating section 2. As described above, the signals for the first five lines are obtained by reading out, from the parallel-serial register 13, random numbers produced by the oscillator 11 and the flip-flop circuits $FF_1$ to $FF_4$ and supplied, in parallel, to the register 13. The code signals outputted from the register 13 is supplied to the program indicating code and logic circuit 33 through the gate 14, the OR gates 34 and 32 to be converted to the encode control signal.

When the code number inserted into the first six lines of the vertical blanking period is received by the decoder at the subscriber's side, a mode represented by the code number is read in such a manner that the number may preferentially be decoded from the signal of the sixth line to the signal of the first line, i.e., in the reversed sequence to the sequence of the transmission. If the sixth line contains a signal of the A-mode or the B-mode, the mode reading is not carried out any more. In other words, only when the sixth line does not contain the A-mode or the B-mode signal, the signals of the fifth to the first lines are further subjected to decoding. Where the sixth line is set in the A-mode or the B-mode by the code generating section 2, as in the present invention, the code of the sixth line suffices as the information for determining the mode, and the inversion mode is determined by the code of the sixth line.

Figure 5:
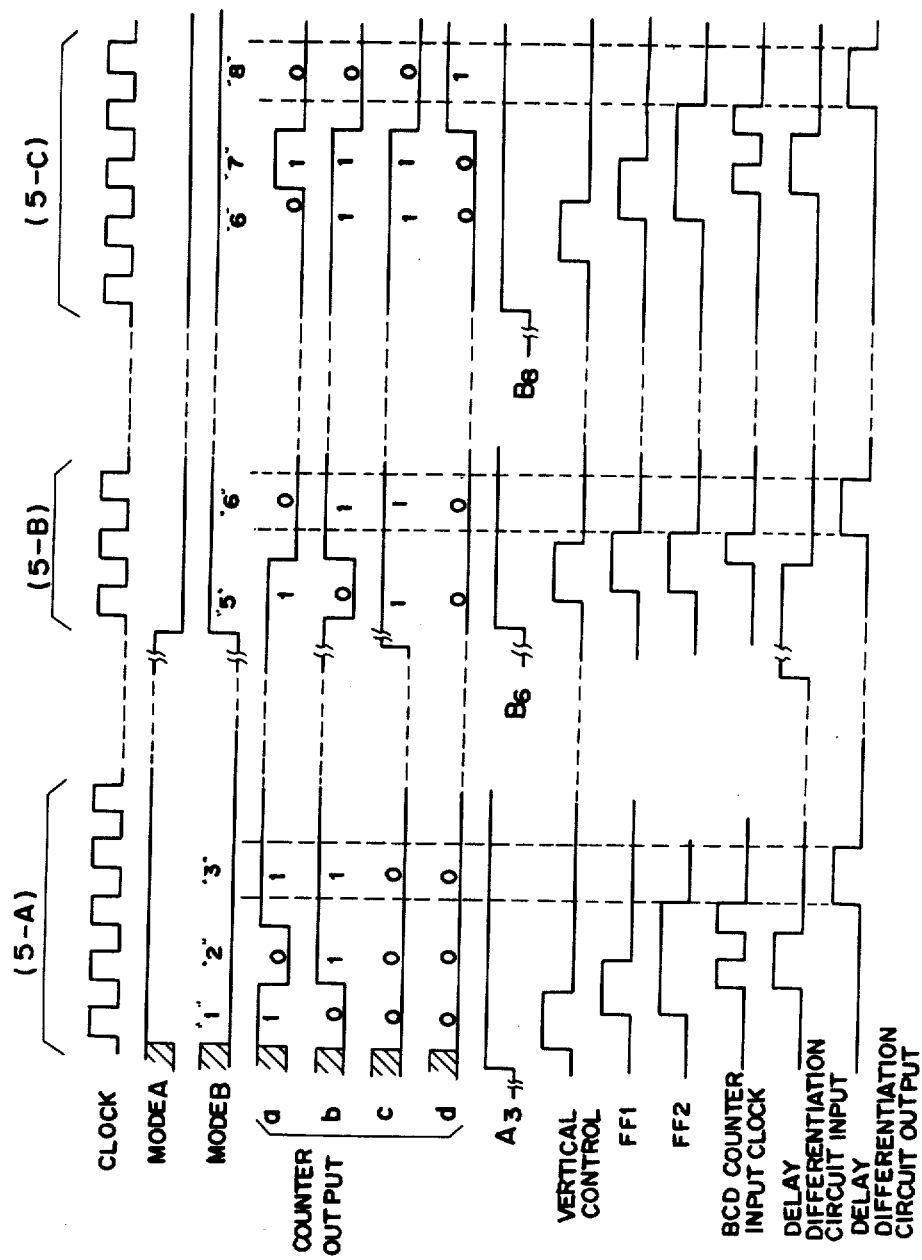
FIG. 5 is a timing chart for explaining an operation of the circuit illustrated in FIG. 2.

(5-A) of FIG. 5 illustrates a case where a coincidence signal has not yet been obtained at the time of arrival of the vertical control signal. Outputs of the binary-coded decimal counter 23 are: $a=1$ and $b=c=d=0$. Values of $[A]_2$ and $[B]_2$ of the multiplexers $M_1$ and $M_2$ are outputted. As described above, while $[A]_2=0$ and $[B]_2=1$, outputs of the mode generating circuit 24 are: $A=1$ and $B=0$. Therefore, outputs of AND gates $G_3$ and $G_4$ of A and B group coincidence circuits 27 and 28 are logic-0 and no coincidence signal is outputted.

Upon inputting of the vertical control signal to the gate logic circuit 22, an output of the flip-flop circuit 1 becomes logic-1 so that an output of the flip-flop circuit $FF_2$ becomes logic-1. As a result, one input of the AND gate $G_1$ becomes logic-1, and when a logic-1 signal is outputted from the oscillator 21, the AND gate $G_1$ supplies a pulse output to the counter 23. The counter 23 makes increment and outputs thereof become $a=c=d=0$ and $b=1$. At this time, the conditions of the multiplexers $M_1$ and $M_2$ are: $[A]_3=1$ and $[B]_3=0$. Therefore, the AND gate $G_3$ supplies logic-1 output to the OR gate GG, and accordingly the coincidence signal is supplied to the delay differentiating circuit DD of the gate logic circuit 22. As described before, the delay differentiating circuit DD puts the flip-flop circuit $FF_2$ into a reset state after a delay of $1\frac{1}{2}$ cycle to output a latch control signal to the 4 bit latch circuit 25. Thus, the output of the counter 23 is in advance by one count and the values to be latched by the 4-bit latch circuit 25 are: $a=b=1$ and $c=d=0$. More particularly, a decimal number 3 which is $[A]_3=1$, is latched corresponding to the output A, transmitted in series according to the clock from the 4-H oscillator by the 4-bit parallel-serial shift register 26 and supplied to the program indicating code and logic circuit 33 as a code for the sixth line through the OR gates 34 and 32 (FIG. 1).

(5-B) of FIG. 5 illustrates a case where a coincidence signal has already been outputted when the vertical control signal arrives. In this case, the mode is assumed to be B-mode provided by the mode generating circuit 24. The conditions of the multiplexers at the addresses determined by outputs of the counter 23, $a=c=1$ and $b=d=0$, are $[A]_6=0$ and $[B]_6=1$ so that the coincidence signal is supplied to the gate logic circuit 22. Under these conditions, when the vertical control signal arrives, the delay differentiating circuit DD, which is adapted to produce an output $1\frac{1}{2}$ cycle of clock after the output of the flip-flop circuit $FF_1$ is changed from logic-0 to logic-1, resets the flip-flop circuits 2 after such delay. Between when the output of the flip-flop circuit $FF_2$ becomes logic-1 after arrival of the vertical control signal and when the flip-flop circuit $FF_2$ is reset, a pulse from the oscillator 21 is supplied to the counter 23 through the AND gate $G_1$, and the outputs of the counter 23 are: $a=d=0$ and $b=c=1$ (decimal number 6). The value is latched by the 4-bit latch circuit 25 and transmitted.

(5-c) of FIG. 5 illustrates a case where a count value of the binary-coded decimal counter 23 is eight or more. When the mode is B and the outputs of the counter 23 are $a=d=0$ and $b=c=1$, outputs of the multiplexers $M_1$ and $M_2$ are $[A]_7=1$ and $[B]_7=0$. Therefore, no coincidence signal is not outputted, so that the operation proceeds in a manner similar to that in (5-a) until the outputs of the counter become $a=b=c=0$ and $d=1$ (decimal number 8). Since the output d of the counter 23 is used as a strobe signal for the multiplexers, any input to the multiplexers $M_1$ and $M_2$ is not outputted and the outputs of the multiplexers are in the states of high impedance. The logic-0 signal is supplied to the AND gates $G_3$ and $G_4$ by the resistors $R_A$ and $R_B$ and no coincidence signal is supplied during the existence of decimal numbers 8 and 9. Therefore, under a condition where the counter 23 outputs decimal numbers 9 and 0, the 4-bit latch circuit does not latch data.

As described above, under any condition of FIG. 5, the encode control signal is outputted in a mode outputted from the mode generating circuit 24 of the code generating section 2.

The simulative random pulse generating circuit as illustrated in FIG. 4 is a known simulative random pulse generating circuit formed of presettable 9-stage serial-parallel shift register and an exclusive OR, and preliminarily set so that a terminal $P_1$ may be 1 and terminals $P_2$ to $P_9$ are 0 before operation. Outputs of the simulative random pulse generating circuit are random pulses having a cycle of $(2^n-1)$ x clock length. Although desired secrecy can be obtained by this circuit, the number of stages may be increased to increase degree of randomness.

Figure 6:
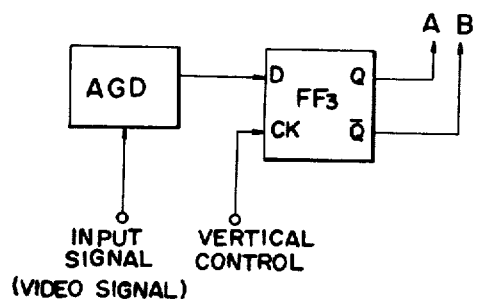
FIG. 6 is a block diagram of a modification of mode generating circuit.

Another form of mode generating circuit 24 is illustrated in FIG. 6. The mode generating circuit 24 in FIG. 6 is comprised of a detecting circuit AGD for detecting a change of average gradation in a video signal and a flip-flop circuit $FF_3$. Q and $\bar{Q}$ outputs of the flip-flop circuit $FF_3$ are supplied to the A-group coincidence circuit and the B-group coincidence circuit as A-mode and B-mode signals, respectively. The A- and B-signals from the flip-flop circuit $FF_3$ correspond to the outputs A and B from the program indicating code and logic circuit 33 of FIG. 2.

Figure 7:
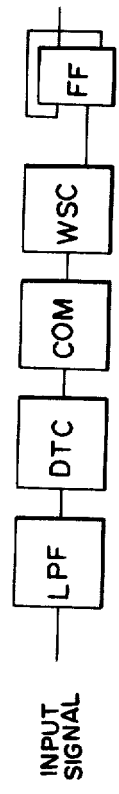
FIG. 7 is a block diagram of a specific formation of a detecting circuit for detecting a change in an average gradation of a video signal.

The video signal average gradation change detecting circuit AGD is adapted to detect a change in the average gradation of the video signal so that an operation of inverting the polarity of video signal may be effected not randomly and independently of the picture quality but only when the average gradation of the video signal changes. A specific arrangement of the video signal average gradation change detecting circuit is exemplarily illustrated in FIG. 7. In FIG. 7, the detecting circuit AGD is comprised of a low-pass filter LPF, a differentiating circuit DTC, a comparator COM, a wave shaping circuit WSC and a flip-flop circuit FF. The low-pass filter LPF outputs a signal proportional to the average gradation of the video signal supplied thereto as an input signal by eliminating a higher component of the video signal. The differentiating circuit DTC detects a change amount of the signal corresponding to the average gradation from the low-pass filter LPF. The comparator COM compares the change amount detected by the differentiating circuit DTC with a predetermined value and outputs when the change amount is larger than the predetermined value, so that a relatively abrupt change in the average gradation can be detected. The waveform shaping circuit WSC shapes an output waveform of the comparator COM into a logic signal suited for the succeeding flip-flop circuit FF. The flip-flop circuit FF inverts the logic condition of the output upon receiving every pulse signal from the waveform shaping circuit WSC.

An output from the detecting circuit AGD is supplied to a D input of the flip-flop circuit $FF_3$. When a vertical control signal is applied to a clock input CK of the flip-flop circuit $FF_3$, the conditions (A-mode or B-mode) of the output Q and $\bar{Q}$ are determined. When the mode generating circuit 24 outputs an A-mode (output Q is logic-1 and output $\bar{Q}$ is logic-0), if an output OUT[A]read from the multiplexer $M_1$ according to an address determined by an output of the binary-coded decimal counter is logic-1, the AND gate $G_3$ supplies, as a coincidence signal, the logic-1 output to the gate logic circuit 22 through the OR gate GG. A similar operation is carried out for the B mode.

Figure 8:
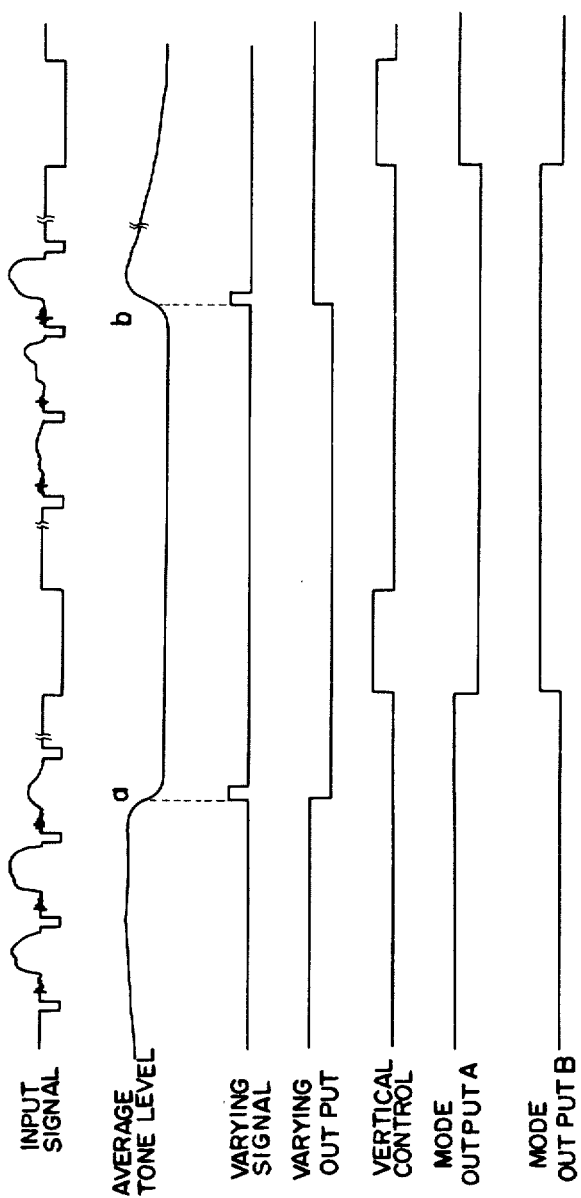
FIG. 8 is a waveform diagram for explaining an operation of the circuit illustrated in FIG. 6.

FIG. 8 is a waveform diagram for explaining an operation of the mode generating circuit 24 of FIG. 6. When an input signal having a waveform as illustrated in FIG. 8 is supplied to the detecting circuit AGD, an output of the low-pass filter LPF (FIG. 7) represents an average gradation or tone level. Change rates of the average gradation level at point a and point b are relatively large, so that the waveform shaping circuit WSC provides change signals to the flip-flop circuits FF at points a and b. As a result, change outputs from the flip-flop circuit FF are as shown in FIG. 8. When the vertical control signal is supplied to the clock input CK of the flip-flop circuit $FF_3$, the mode outputs A and B (outputs Q and $\bar{Q}$) are inverted. Thus, since the mode signal varies in accordance with an information that the input signal per se has, the present form of the mode generating circuit can provide sufficient randomness.

We claim:

1. A coding system producing an encode control signal for encoding a television signal by inverting at least a part of the television signal, which comprises:
    a first means for generating first random code signals;
    a second means for generating second random code signals corresponding to a predetermined value of said encode control signal; and
    a third means for inserting the first random code signals into the first five lines of the first six lines within a vertical blanking period of said television signal and the second random code signal into the sixth line to produce said encode control signal, said second means including:
    a clock-pulse generating means;
    a counter means for counting clock pulses from said clock-pulse generating means;
    an inversion mode generating means for producing inversion mode signals indicating a plurality of inversion modes;
    a program indicating means for producing program indicating signals;
    a setting means for providing predetermined signals in response to outputs from said counter means and said program indicating signal;
    a coincidence means for producing a coincidence signal when the mode signal and the predetermined signal are in a predetermined relation; and
    a means for producing the second random code signal corresponding to the count value of said counter in response to the coincidence signal.

2. A coding system as claimed in claim 1, wherein said mode generating means includes a random-pulse generating circuit and a timer, said timer being adapted to provide a clock pulse to said random-pulse generating circuit.

3. A coding system as claimed in claim 1, wherein said inversion mode generating means changes inversion mode signals when an average gradation of the television signal changes.

4. A coding system as claimed in claim 3, wherein said inversion mode generating means includes a detecting circuit for detecting an average gradation change of the television signal and a flip-flop circuit to which an output from said detecting circuit is applied.

5. A coding system as claimed in claim 4, wherein said detecting circuit includes a low-pass filter, a differentiating circuit and a comparator.

* * * * *